Nov. 5, 1963   H. E. KARIG   3,109,401
CLOSED CYCLE TORPEDO POWER PLANT
Filed Aug. 14, 1959   2 Sheets-Sheet 1
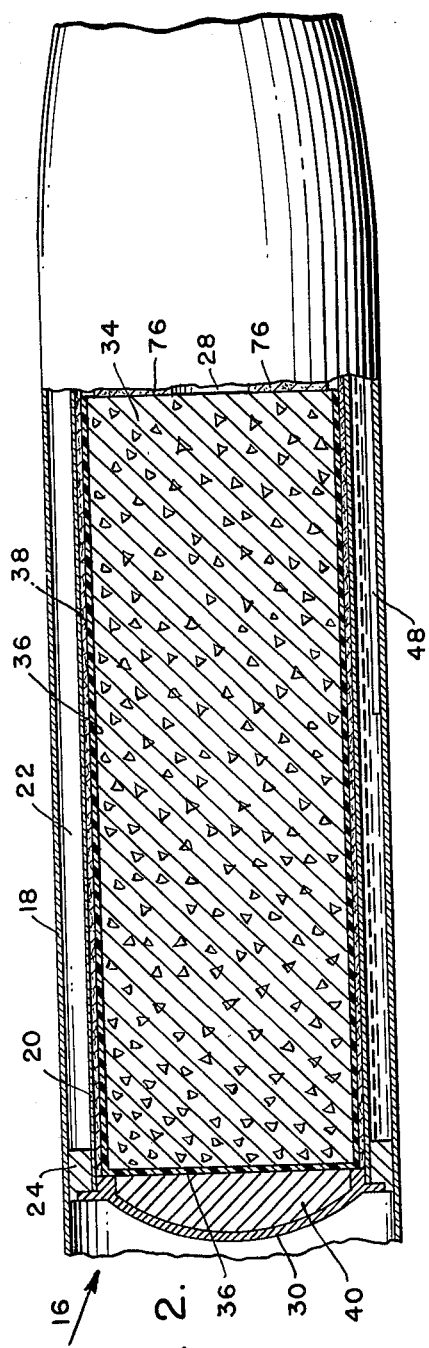
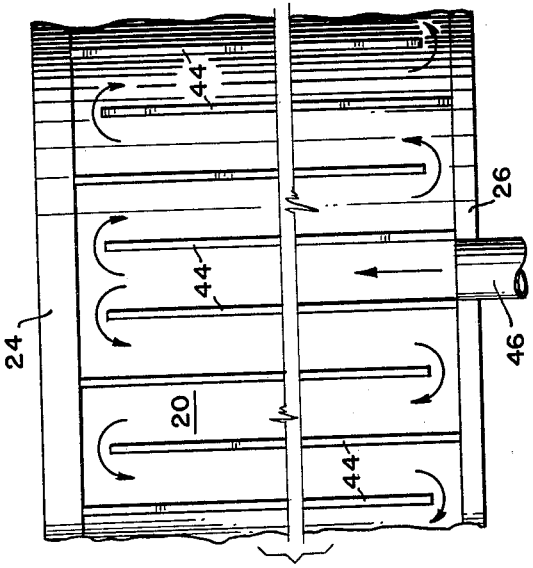
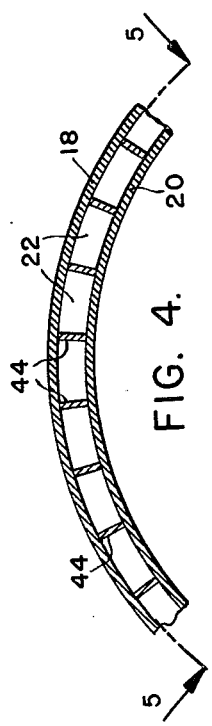
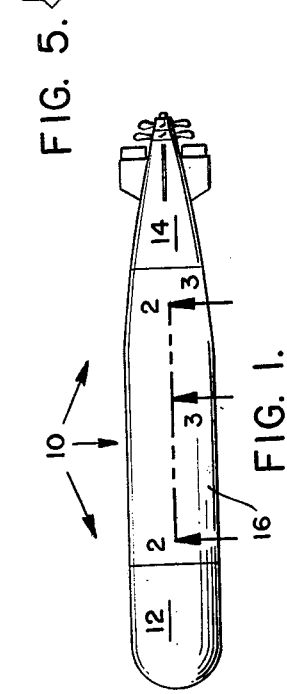
INVENTOR.
HORACE E. KARIG
BY
ATTORNEYS.

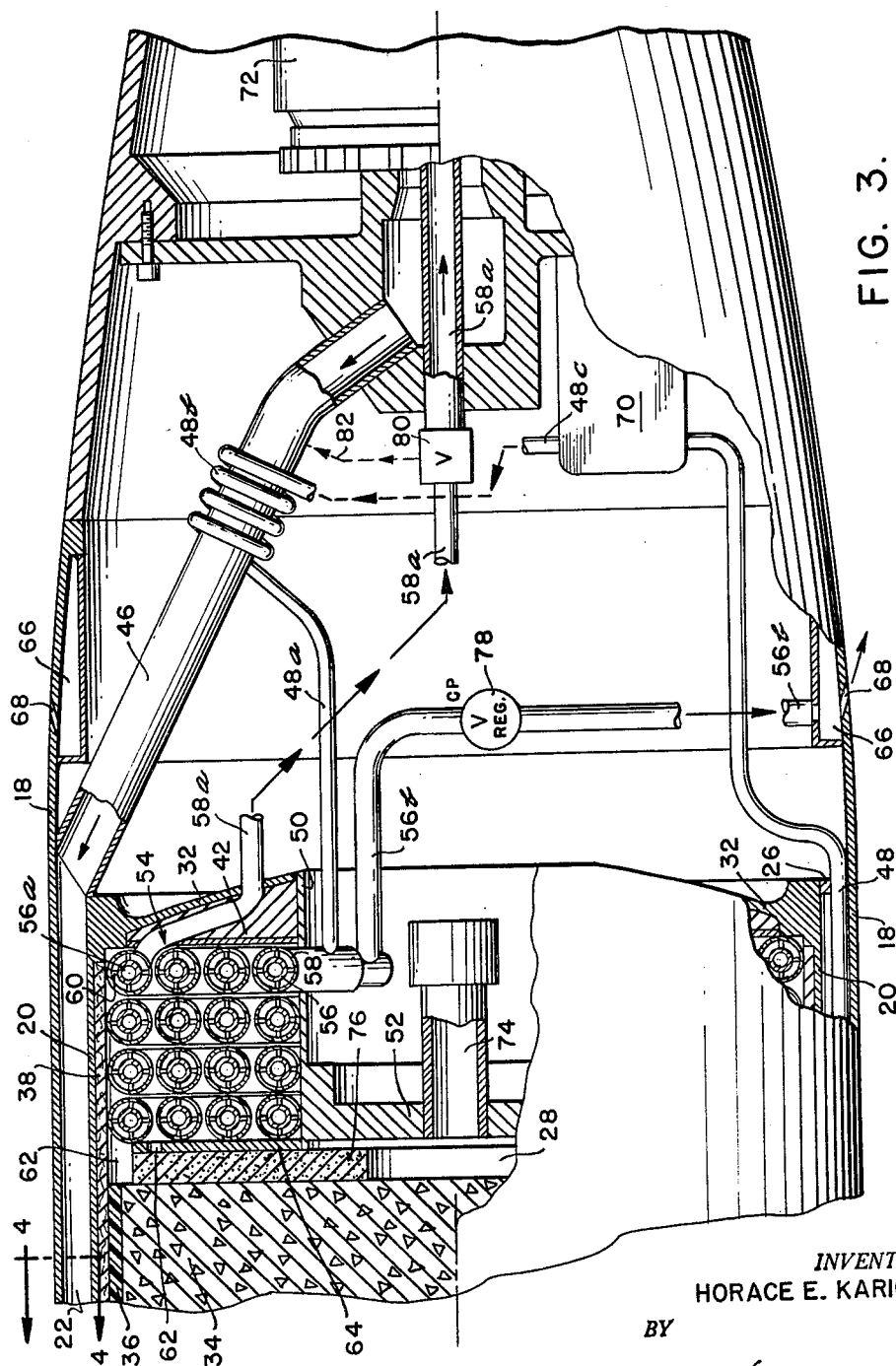

United States Patent Office 3,109,401
Patented Nov. 5, 1963

3,109,401
CLOSED CYCLE TORPEDO POWER PLANT
Horace E. Karig, Flintridge, Calif., assignor to the United States of America as represented by the Secretary of the Navy
Filed Aug. 14, 1959, Ser. No. 833,899
12 Claims. (Cl. 114—20)
(Granted under Title 35, U.S. Code (1952), sec. 266)

The invention described herein may be manufactured and used by or for the Government of the United States of America for governmental purposes without the payment of any royalties thereon or therefor.

This invention relates to torpedoes and more particularly to improvements in their propulsion systems.

Prior art torpedoes, over the many years of their development, have been provided with various forms of energy sources, exemplary of which in the more modern torpedoes include fuel and oxygen. In the older and now obsolescent types of this class liquid fuel such as alcohol or other hydrocarbon is reacted in a combustion chamber with compressed air or oxygen and the products of combustion are passed through a turbine or other suitable engine and thence exhausted into the ambient water, the engine operating propulsion means such as propellers or other devices to produce thrust, the thermodynamic cycle being known as an "open cycle." In the more modern types of this class which continue under development the open cycle remains the same but the energy source is in the form of a solid propellant of any suitable fuel and oxidizer or a liquid propellant comprising a liquid fuel and oxidizer. As between the two latter types the solid propellant has some advantages in that its overall space-weight ratio per unit of energy is generally higher since it does not require pumps and other weighty equipment to deliver it to a combustion zone. The judicious selection of one or the other of these two types of propellant for a torpedo is analogous to their selection for use in rockets which also employ same.

The solid propellant type of torpedo operating on an open cycle, while a considerable advance in the art, has, however, certain disadvantages among which are loss of efficiency above or below an optimum designed running depth in the water, and particularly below the optimum running depth. Since modern warfare tactics dictate the desirability of much greater running depths than were heretofore possible it becomes apparent that the overall performance of a deep running torpedo of the solid propellant type could be improved if this loss of efficiency could be obviated.

One of the objects of this invention is to provide a deep running torpedo in which its expansible gaseous energy transforming medium recirculates within the torpedo in a closed cycle in contradistinction to an open cycle in which the gaseous medium is exhausted into ambient water.

Another object is to provide a novel arrangement of energy source, combustion chamber, steam boiler and condenser, producing a compact and relatively light weight gas supply source for operating a torpedo engine.

Another object is to provide a compact, light weight boiler and superheater having high heat transfer characteristics and which is so constructed to eliminate or minimize the difference in pressure between the heat source and the working fluid within the boiler.

Another object is to provide a novel torpedo hull construction which forms a part of a steam condenser.

Still further objects, advantages and salient features will become more apparent from the description to follow, the appended claims, and the accompanying drawing, in which:

FIG. 1 is a side elevation of a torpedo employing the invention;

FIG. 2 is an enlarged section taken on line 2—2, FIG. 1;

FIG. 3 is an enlarged section taken on line 3—3, FIG. 1;

FIG. 4 is a section taken on line 4—4, FIG. 3, and

FIG. 5 is a section taken on line 5—5, FIG. 4.

Referring in detail to the drawing, FIG. 1 illustrates a torpedo 10 having a nose or warhead section 12 and a tail cone section 14, both of any conventional type or construction, and an intermediate section 16 of novel construction and forming the subject of the invention.

The forward or left portion of section 16, as best shown in FIG. 2, comprises an outer cylindrical shell or hull 18 and a concentric cylindrical tube 20 forming an annular space 22 therebetween, the forward end of this space being closed by an annular bulkhead 24 and the rearward end being closed by a similar bulkhead 26 (FIG. 3). The forward end of the cylindrical space 28 within tube 20 is closed by a dome shaped closure 30 secured to bulkhead 24 and tube 20 and the rear end is similarly closed (FIG. 3) by a closure 32 secured to bulkhead 26 and tube 20. A cylindrical solid propellant grain 34, formed of fuel and oxidant, such as employed in rocket motors, and having a cover of flame resistant or inhibiting material 36 engaging its peripheral and forward end surfaces, is disposed within space 28, an annular sheath 38 of porous heat insulating material being disposed between tube 20 and the peripheral outer surface of the inhibitor. A filler pad 40 is disposed within the space formed by the forward end of the grain and closure 30 for transmitting pressure within space 28 to this closure and a similar pad 42 is disposed adjacent rear closure 32 to serve the same purpose. Annular space 22, in which steam is condensed, is divided longitudinally by ribs 44 into a plurality of compartments to provide relatively long flow conduits between the top and bottom portions of this space. As best shown in FIG. 5, steam enters the condenser through conduit 46, at the top of the space, flows forwardly between adjacent ribs, divides its path as shown by the arrows, thence flowing rearwardly, this forward and rearward flow continuing alternately around both sides of space 22 until the steam condenses and collects as boiler feed water in the lower portion of the space from whence it is returned to the boiler, to be subsequently described, through a feed water conduit 48.

Referring now to FIG. 3, which illustrates in detail the right or rearward portion of hull section 16, closure 32, previously referred to, is secured to a cylindrical tubular wall 50, the forward end of which is closed by a plate 52. The annular space surrounding wall 50 contains a boiler evaporating tube 54 comprising an inner tube 56 and a concentric outer tube 58 spaced from the inner tube by spacers 60 which may be in the form of a plurality of angularly spaced helically wound wires which provide a plurality of angularly spaced helical paths extending between the ends of tube 54. Tube 54 is wound helically about wall 50 in a plurality of layers with the outmost and terminating end 56a of the inner tube communicating with the annular surrounding wall 50 which space, in turn, communicates with space 28 through suitable apertures 62 in a plate 64. The inner end of tube 56 communicates with a conduit 56b which communicates with an annular space 66 within the hull section which is provided with a plurality of angularly spaced exhaust apertures 68. The inner end of the annular space between tubes 56, 58 communicates with feed water tube 48 through conduit 48a, economizer coil 48b, conduit 48c and feed water pump 70. The outer end of the space just referred to communicates with a steam engine 72 through conduit 58a. An igniter chamber 74 communicates with space 28 and may contain any suitable type of squib, which upon being ignited, will ignite a booster charge 76, the latter being adapted to initiate burning of the propellant grain 34.

In the operation of the device it will be assumed that the torpedo is launched in any conventional manner and that inner tube 56 of the boiler is full or contains sufficient water to produce steam. Substantially simultaneously with launching, the propellant grain is ignited which produces heated gases which pass through apertures 62 and into contact with the outside surface of tube 58 and into the outer end 56a of inner tube 56, thence through tube 56 and exhausting to ambient water through conduit 56b, annular space 66 and apertures 68. Water in tube 58 is thus evaporated, providing steam under pressure, which is delivered through conduit 58a to steam engine 72 which begins operation, driving pump 70. Exhaust steam from engine 72 is delivered through conduit 46 to the top of the annular condenser and heat is extracted by heat transfer to ambient sea water producing condensate in the lower portion of the condenser which is then recirculated through tube 48 and pump 70 back to the boiler, the closed cycle continuing until the torpedo intercepts its target or until propulsion grain 34 burns out.

Any suitable type of pressure regulating and uni-directional flow valve 78 may be disposed in gas exhaust conduit 56 to maintain the combustion chamber at a desired pressure during operation and to prevent flow of ambient water into same when the combustion chamber is not in operation. Also, if it is desired to provide variable power or speed output of the engine in a system which employs a source of heat which generates heat at a substantially constant rate, such as a solid propellant grain, a valve 80, disposed in steam conduit 58a, may be employed which bypasses part of the steam through a conduit 82 back to the condenser. When the source of heat is of a type which can be readily regulated as to rate of generation of heat, such as liquid fuels and oxidants, suitable control valves may be employed in the liquid fuel and oxidant supply conduits in lieu of valve 80 to effect generation of steam in accordance with engine requirements at various power or speed outputs. As will be apparent, when power output or speed of the engine is to remain constant at its maximum all of the control valves just referred to may be omitted.

The general construction and operation having been described, the further purposes and advantages of certain of the components will now be set forth with reference to an exemplary torpedo adapted to operate at 3000 feet below sea level. In the tabulation to follow all pressures are in pounds per square inch absolute and temperatures are in degrees Fahrenheit.

| | | |
|---|---|---|
| Ambient water pressure | p.s.i.a | 1345 |
| Combustion chamber pressure | p.s.i.a | 1500 |
| Combustion chamber temperature | ° F | 2380 |
| Exhaust gas pressure | p.s.i.a | 1300–1350 |
| Exhaust gas temperature | ° F | 600 |
| Steam pressure | p.s.i.a | 1500 |
| Steam temperature | ° F | 1600 |
| Condenser pressure | p.s.i.a | 15–12 |
| Feed water pressure | p.s.i.a | 1800–2000 |
| Feed water temperature | ° F | 200 |

From the foregoing it will be apparent that since the interior of tube 56 and the exterior of tube 58 are subjected to combustion chamber pressure (1500 p.s.i.a.) and the annular space between tubes 56, 58 is subjected to steam pressure (1500 p.s.i.a.) equal to the combustion chamber pressure all pressures are balanced and hence no forces, resulting from pressure, are present which would tend to stress the tubes. This, therefore permits use of extremely thin wall tubing. The advantages of this are several: The temperature gradient through the wall of tube 56 is highly reduced in comparison with a tube which could withstand a differential pressure of 1500 p.s.i.a.; by reducing the temperature gradient through a tube wall the thermal stresses within the wall are reduced; also, based upon the same comparison, the thermal conductivity is increased and overall weight is reduced. The critical point of design of tube 56 is at its outer or inlet end where combustion gas enters tube end 56a and superheated steam exhausts from the space between the tubes. At this point gas temperature is 2380° and steam temperature is 1600°. If designed to withstand thermal stresses resulting from the difference between these temperatures (780°) the remaining portions of the tubes will be subjected to lesser thermal stresses. For example, at the inner end of tube 56 water enters at 200° and gas exhausts at 600° making a differential temperature of 400°, compared to 780°. While it might appear that the inner end of outer tube 58 would be subjected to a high temperature differential (combustion chamber temperature 2380°—feed water temperature 200°=2180°) and hence high thermal stress this actually does not occur since the gas surrounding tube 58 is stagnant and hence at a relatively low temperature due to its cooling by the feed water and steam flow through the space between the tubes.

As previously set forth, an annular sheath 38 of porous heat insulating material is disposed between shell 20 and the peripheral outer surface of rocket grain inhibitor 36. This sheath performs several important functions. As an insulator, it reduces conduction of heat from the combustion chamber to the condenser. Since it is also porous, combustion chamber gas pressure is present within its interstices and hence this gas pressure exerts an inward compressive force on the outside of the inhibitor preventing the inhibitor from separating from the propellant grain which, in turn, prevents combustion chamber gas and flame from flowing along the outside surface of the propellant grain and thus restricting burning of the latter to its exposed circular end surface. Also, since combustion chamber pressure is present within the porous sheath the entire inner surface of shell 20 is pressurized, irrespective of the amount of the propellant which has been consumed. Thus, when the propellant is burning at the assumed depth of 3000 feet the entire inner surface of shell 20 is pressurized to 1500 p.s.i.a., the outer surface of shell 18 is pressurized to 1345 p.s.i.a. and space 22 between the two is pressurized to 15–50 p.s.i.a. Thus, the pressure differential across the inner and outer walls of the condenser at the areas adjacent ribs 44 is of the order of 105–140 p.s.i.a. Pressure differential in the areas between ribs is considerably higher than the range just mentioned, however, by disposing the ribs at relatively close spacing thin inner and outer condenser walls may be employed since ribs 44 act to transfer stresses between the two walls. Otherwise stated, if ribs 44 were eliminated both the inner and outer walls would be considerably thicker to withstand the pressure differential across the individual walls. Analogous to the description of boiler tube 56 a thinner outer wall 18 reduces the temperature gradient to the sea water coolant thus increasing rate of heat transfer between the engine exhaust steam and sea water.

Obviously many modifications and variations of the present invention are possible in the light of the above teachings. It is therefore to be understood that within the scope of the appended claims the invention may be practiced otherwise than as specifically described.

What is claimed is:

1. A torpedo comprising an outer cylindrical hull, a combustion chamber within said hull adapted to provide products of combustion, a boiler within said hull disposed in heat exchange relation to said combustion chamber, communicating means for exhausting said products of combustion to ambient water after passing in heat exchange relation to said boiler, means for supplying said boiler with condensate, means communicating said boiler with a steam engine adapted to provide power for propelling the torpedo, a steam condenser communicating with said steam engine adapted to condense exhaust from said steam engine into said condensate, said outer hull forming a wall of said condenser and adapted to conduct heat from said exhaust steam to ambient water, a tube closed at opposite ends thereof and disposed within said hull forming an annular space between its outer surface and the inner surface of said hull, said annular space forming a part of said condenser, and a solid propellant grain disposed within said tube, the space within said tube forming said combustion chamber in which said products of combustion are formed.

2. A torpedo in accordance with claim 1 including a plurality of spaced rib members disposed within said annular space adapted to transfer stresses between said hull and said tube and providing a path of steam flow between the upper and lower portions of said space substantially in excess of the circumferential distances between said portions.

3. A torpedo in accordance with claim 2, wherein said ribs extend longitudinally of the torpedo and are arranged to effect alternate rearward flow of exhaust steam from the top of said annular space to the bottom thereof and around opposite sides of the torpedo.

4. A torpedo in accordance with claim 3 wherein said means for supplying said boiler with condensate includes means for conducting condensate away from the bottom of said space.

5. A torpedo in accordance with claim 1 wherein said boiler is disposed within said tube.

6. A torpedo in accordance with claim 5 wherein said boiler comprises a pair of spaced concentric tubes, the inner tube adapted to conduct said products of combustion to ambient water, one end of the space between said tubes adapted to receive said condensate and the other end of said space adapted to deliver steam for subsequent delivery to said steam engine.

7. A torpedo in accordance with claim 1 wherein said grain is cylindrical and its peripheral surface is provided with a cover of flame resistant material, and an annular sheath filling the space between the inner surface of said tube and the outer surface of said cover, said sheath being of heat insulating material to reduce conduction of heat from said combustion chamber to said condenser and being porous to permit application of combustion chamber pressure to the outer surface of said cover and to the inner surface of said tube.

8. A torpedo comprising an outer cylindrical hull, a tube closed at opposite ends thereof disposed within said hull forming an annular space between its outer surface and the inner surface of said hull, said annular space forming a part of a steam condenser, and the space within said tube forming a combustion chamber, a boiler disposed in one end of said tube, said boiler comprising a coiled pair of spaced concentric tubes, the inner one thereof adapted to conduct products of combustion formed within said combustion chamber to ambient water, one end of the space between said tubes adapted to receive condensate and the other end of the space between said tubes adapted to deliver steam for subsequent delivery to a steam engine, a solid propellant grain disposed within said tube, means for conducting condensate from the bottom of said condenser to said one end of the space between said tubes, a steam engine disposed within said hull rearwardly of said combustion chamber, means for conducting steam from said other end of the space between said tubes to said steam engine, and means for conducting steam exhausted by said steam engine to the top of said condenser whereby heat of vaporization of said exhaust steam is conducted through said cylindrical outer hull to ambient water and said steam forms condensate adapted to flow to the bottom of said condenser.

9. A torpedo in accordance with claim 8 including an annular closed space within said outer cylindrical hull, a plurality of angularly spaced apertures extending through said outer cylindrical hull and communicating said annular closed space with ambient water, one end of the inner tube of said pair of spaced concentric tubes communicating with said annular closed space, whereby products of combustion are exhausted through said spaced apertures.

10. A torpedo in accordance with claim 8 including a pressure regulating valve disposed between said combustion chamber and ambient water constructed and arranged to maintain substantially constant pressure within said combustion chamber.

11. A torpedo in accordance with claim 8 including valve means for delivering a part of the steam from said boiler to said condenser without passing through said steam engine.

12. A torpedo in accordance with claim 8 including means for transferring heat from steam exhausted by said engine to said condensate prior to its delivery to said boiler.

References Cited in the file of this patent

UNITED STATES PATENTS

| | | |
|---|---|---|
| 250,144 | Haight | Nov. 29, 1881 |
| 813,918 | Schmitz | Feb. 27, 1906 |
| 1,089,055 | Holzwrath | Mar. 3, 1914 |
| 1,506,323 | O'Neill | Aug. 26, 1924 |
| 1,804,694 | Jones | May 12, 1931 |
| 1,911,042 | Steenstrup | May 23, 1933 |
| 2,159,758 | Diedrich | May 23, 1939 |
| 2,223,856 | Price | Dec. 30, 1940 |
| 2,853,995 | Marks | Sept. 30, 1958 |